(12) United States Patent
Lin et al.

(10) Patent No.: US 7,667,551 B2
(45) Date of Patent: Feb. 23, 2010

(54) FREQUENCY SHIFT KEYING MODULATOR HAVING SIGMA-DELTA MODULATED PHASE ROTATOR

(75) Inventors: Tsung-Hsin Lin, Taipei (TW); Yao-Hong Liu, Taipei (TW)

(73) Assignee: National Taiwan University, Taipei (TW)

( * ) Notice: Subject to any disclaimer, the term of this patent is extended or adjusted under 35 U.S.C. 154(b) by 99 days.

(21) Appl. No.: 12/127,798

(22) Filed: May 27, 2008

(65) Prior Publication Data

US 2008/0297269 A1 Dec. 4, 2008

(30) Foreign Application Priority Data

May 29, 2007 (TW) .............................. 96119273 A

(51) Int. Cl.
*H03C 3/00* (2006.01)
*H03K 7/06* (2006.01)
*H04L 27/12* (2006.01)
(52) U.S. Cl. ...................................... 332/100; 375/303
(58) Field of Classification Search ......... 332/100–102; 375/303–307
See application file for complete search history.

(56) References Cited

U.S. PATENT DOCUMENTS 6,420,940 B1 * 7/2002 Minnis et al. ............... 332/103

* cited by examiner

*Primary Examiner*—David Mis

(57) ABSTRACT

A frequency shift keying modulator having sigma-delta modulated phase rotator is disclosed, which includes a phase-locked loop for generating a voltage-controlled signal; a multi-phase generator for receiving the voltage-controlled signal and generating N phase-shift signals having same frequency according to the voltage-controlled signal, the N phase-shift signals having a same phase shift between the phase-shift signals adjacent to each other; a sigma-delta modulator for receiving transmission data and randomly outputting a modulation bit at a modulation clock according to the transmission data; and a phase rotator for receiving the N phase-shift signals and selectively outputting one of the N phase-shift signals and a frequency-divided signal according to the modulation bit, wherein the frequency of the frequency-divided signal is $$1 \Big/ \Big(1 + \frac{n}{N}\Big)$$

of the frequency of any one of the N phase-shift signals.

5 Claims, 5 Drawing Sheets

FREQUENCY SHIFT KEYING MODULATOR HAVING SIGMA-DELTA MODULATED PHASE ROTATOR

BACKGROUND OF THE INVENTION

1. Field of the Invention

The present invention relates generally to a frequency shift keying modulator (FSK modulator), and more particularly, to a frequency shift keying modulator having sigma-delta modulated phase rotator.

2. Description of Related Art

In recent years, along with the rapid development of wireless communication technology, transmission data rate of wireless transmitters is becoming higher. The wireless transmitters generally comprise phase-locked loop (PLL) for precisely locking the transmission frequency thereof.

Referring to FIG. 1, a block diagram of a closed-loop direct-modulation wireless transmitter 10 comprising a phase-locked loop 11 is shown. The wireless transmitter 10 comprises a phase-frequency detector (PFD)/charge pump (CP) 102, a loop filter (LF) 104 coupled to the phase-frequency detector (PFD)/charge pump (CP) 102, a voltage-controlled oscillator (VCO) 106 coupled to the loop filter 104, a frequency divider 108 coupled between the voltage-controlled oscillator 106 and the phase-frequency detector (PFD)/charge pump (CP) 102, a driver 110 coupled to the voltage-controlled oscillator 106, and an antenna 112 coupled to the driver 110, wherein the phase-frequency detector/charge pump 102, the loop filter 104, the voltage-controlled oscillator 106 and the frequency divider 108 constitutes a phase-locked loop 11.

The frequency divider 108 divides the frequency of the voltage-controlled signal $f_{VCO}$ outputted from the voltage-controlled oscillator 106 by a frequency division ratio related to the transmission data; the phase-frequency detector/charge pump 102 compares the result outputted from the frequency divider 108 with a reference signal $f_{REF}$ and generates a voltage-raising or voltage-dropping signal according to the difference therebetween such that the voltage-controlled signal $f_{VCO}$ generated by the voltage-controlled oscillator 106 can be locked and is equal to the reference signal $f_{REF}$ multiplied by the frequency division ratio. Equivalently, the frequency of the voltage-controlled signal $f_{VOC}$ is the frequency division ratio times as high as the frequency of the reference signal $f_{REF}$. In other words, by adjusting the frequency division ratio, the frequency of the voltage-controller signal $f_{VCO}$ can be changed.

The closed-loop direct-modulation wireless transmitter 10 has advantages of low power consumption and stable center frequency, but as bandwidth of data is limited by the phase-locked loop 11, the phase-locked loop 11 can only be applied in narrow-band transmission signal.

Referring to FIG. 2, a block diagram of an opened-loop direct-modulation wireless transmitter 20 having another kind of phase-locked loop 21 is shown. Different from the wireless transmitter 10 of FIG. 1, besides the phase-frequency detector (PFD)/charge pump (CP) 102, the loop filter (LF) 104, the voltage-controlled oscillator (VCO) 106, the frequency divider 108, the driver 110 and the antenna 112, the wireless transmitter 20 further comprises a switch 202 coupled between the loop filter 104 and the voltage-controlled oscillator 106. In addition, the transmission data is inputted to the voltage-controlled oscillator 106 instead of into the frequency divider 108. In the wireless transmitter 20, the phase-frequency detector/charge pump 102, the loop filter 104, the voltage-controlled oscillator 106, the frequency divider 108 and the switch 202 constitute a phase-locked loop 21.

The disposing of the switch 202 in the wireless transmitter 20 helps the wireless transmitter 20 having the phase-locked loop 21 overcome the drawback of the wireless transmitter 10 having the phase-locked loop 11 that the wireless transmitter can only be used in narrow band transmission signal. But the wireless transmitter 20 has a drawback of center frequency drift.

SUMMARY OF THE INVENTION

Accordingly, an objective of the present invention to provide a frequency shift keying modulator having sigma-delta modulated phase rotator, which not only has stable center frequency as the conventional closed-loop direct-modulation wireless transmitter but also can be applied in wideband transmission signal as the conventional opened-loop direct-modulation wireless transmitter.

In order to attain the above and other objectives, the frequency shift keying modulator having sigma-delta modulated phase rotator according to the present invention comprises: a phase-locked loop for generating a voltage-controlled signal; a multi-phase generator coupled to the phase-locked loop for receiving the voltage-controlled signal and generating N phase-shift signals having same frequency according to the voltage-controlled signal, the N phase-shift signals having a same phase shift between the phase-shift signals adjacent to each other; a sigma-delta modulator for receiving transmission data and randomly outputting a modulation bit at a modulation clock according to the transmission data; and a phase rotator coupled to the multi-phase generator and the sigma-delta modulator for receiving the N phase-shift signals and selectively outputting one of the N phase-shift signals and a frequency-divided signal according to the modulation bit, wherein the frequency of the frequency-divided signal is $$1 \Big/ \left(1 + \frac{n}{N}\right)$$

of the frequency of any one of the N phase-shift signals, n is an integer in the range of 1 to (N-1).

In a preferred embodiment, the phase rotator comprises: a falling-edge triggered detection N-state machine having a state value, the N-state machine is coupled to the multi-phase generator for receiving the N phase-shift signals and outputting one of the N phase-shift signals corresponding to the state value; an accumulator coupled to the N-state machine for counting the number of the falling edges of the phase-shift signal outputted from the N-state machine according to the modulation bit and resetting the accumulated value to zero when the accumulated value reaches a predefined value, and adding the state value by 1 in the case the state value does not reach the biggest value, and otherwise in the case the state value reaches the biggest value, retuning the state value to the smallest value; a subtractor coupled to the N-state machine for subtracting the state value by 1 in the case the state value is not equal to the smallest value and setting the state value to the biggest value in the case the state value is equal to the smallest value; and a N-to-1 multiplexer coupled to the multi-phase generator and the subtractor for outputting one of the N phase-shift signals corresponding to the state value outputted from the subtractor as the frequency-divided signal.

By disposing of the sigma-delta modulator and dependant on different transmission data, the frequency shift keying modulator of the present invention can generate a transmission signal with a frequency in the range from 1 to $$1\big/\left(1+\frac{n}{N}\right)$$

of the frequency of any of the N phase-shift signals.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification.

Figure 3:
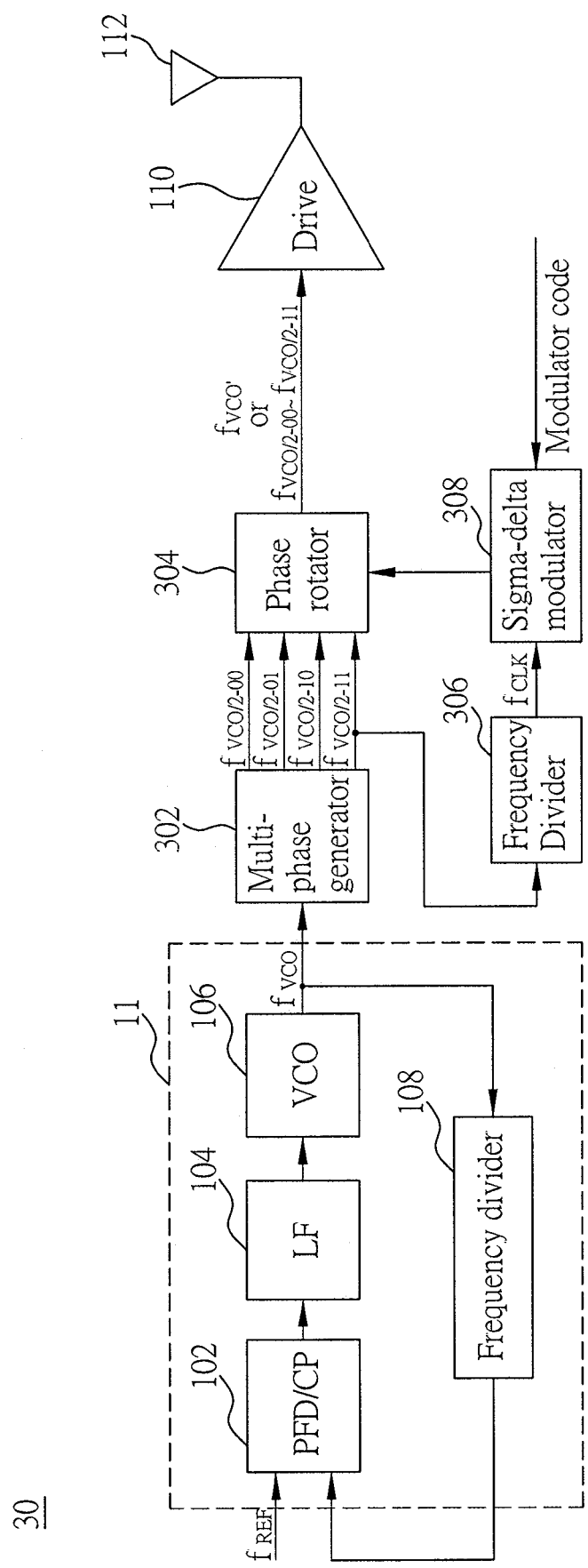
FIG. 3 is a block diagram of a frequency shift keying modulator having sigma-delta modulated phase rotator according to a preferred embodiment of the present invention.

FIG. 3 is a block diagram of a frequency shift keying modulator 30 having sigma-delta modulated phase rotator 304 according to a preferred embodiment of the present invention.

Figure 1:
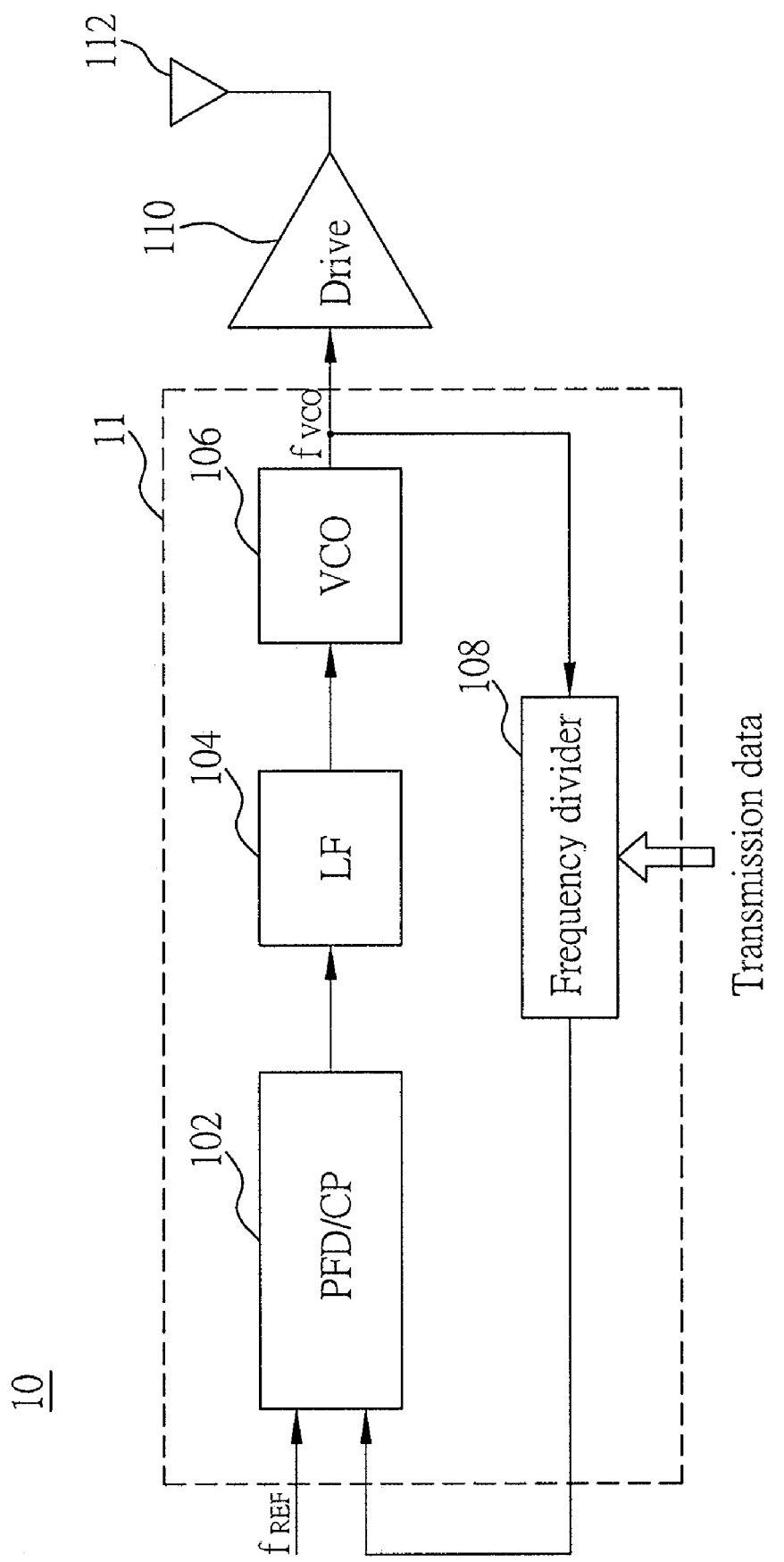
FIG. 1 is a block diagram of a conventional closed-loop direct-modulation wireless transmitter.
Figure 2:
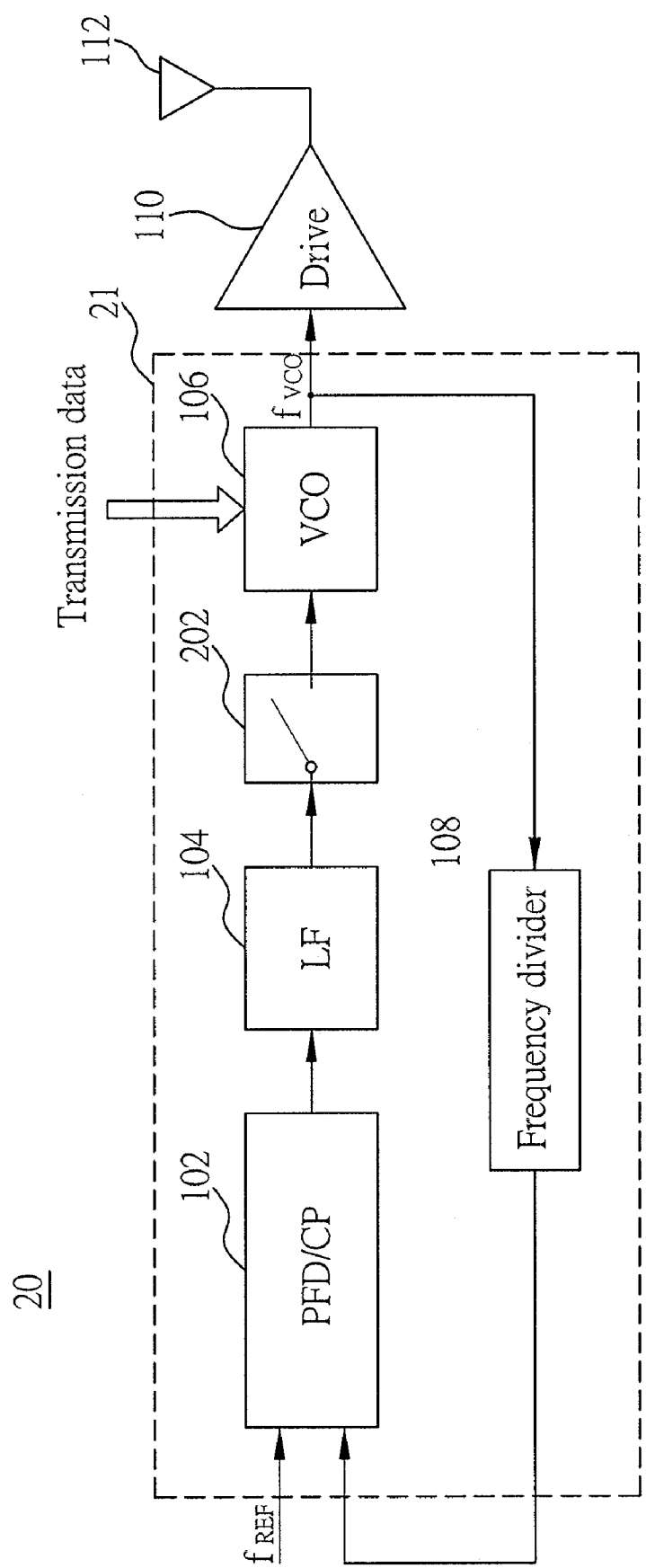
FIG. 2 is a block diagram of a conventional openen-loop direct-modulation wireless transmitter.

The frequency shift keying modulator 30 comprises the phase-locked loop 11 as shown in FIG. 1, a multi-phase generator 302 coupled to the voltage-controlled oscillator 106 of the phase-locked loop 11, a phase rotator 304 coupled to the multi-phase generator 302, a frequency divider 306 coupled to the multi-phase generator 302, and a sigma-delta modulator 308 coupled between the frequency divider 306 and the phase rotator 304.

As shown in FIG. 1, the phase-locked loop 11 generates a voltage-controlled signal $f_{VCO}$.

Figure 4:
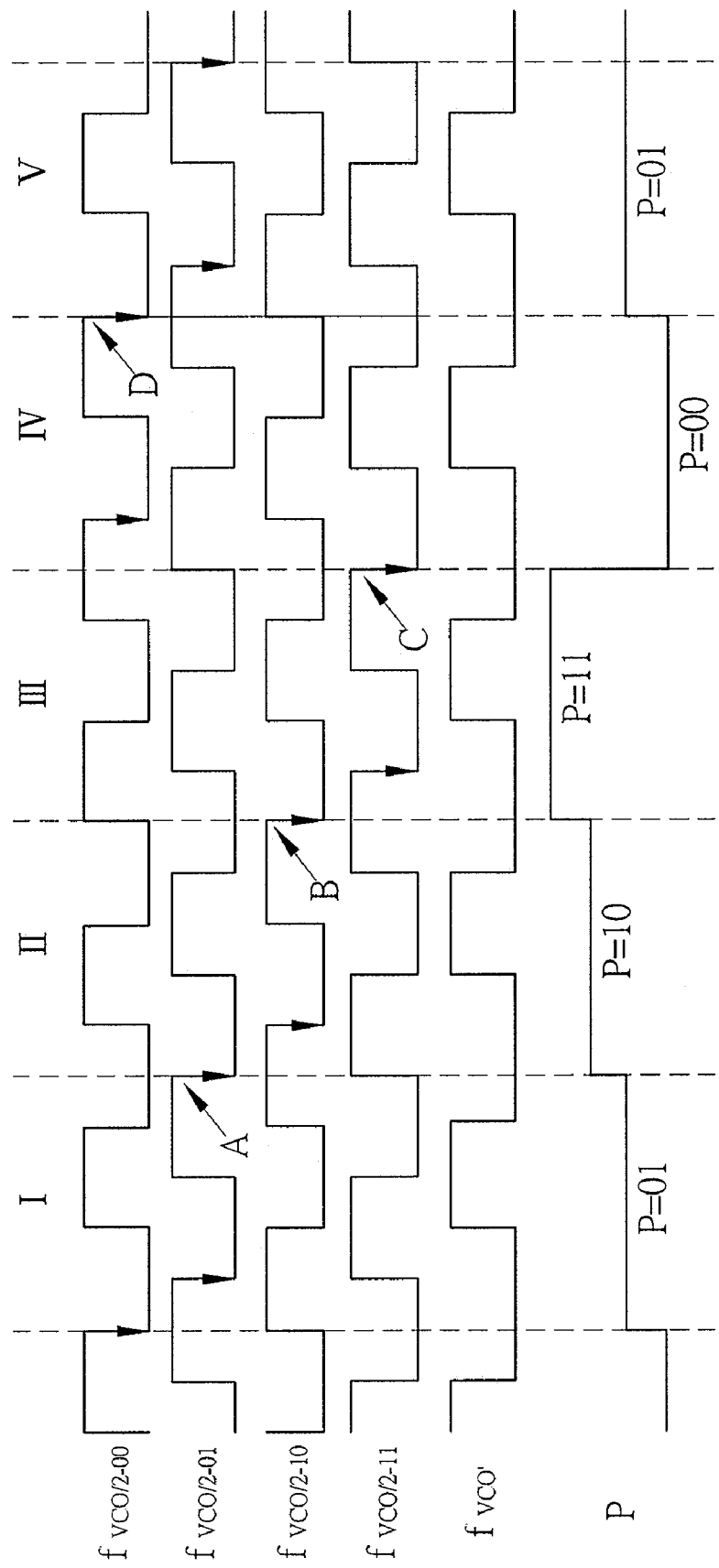
FIG. 4 is a waveform diagram of part of signals of the frequency shift keying modulator of FIG. 3.

The multi-phase generator 302 receives the voltage-controlled signal $f_{VCO}$ and generates N phase-shift signals having same frequency according to the voltage-controlled signal $f_{VCO}$, wherein the N phase-shift signals have a same phase shift between the phase-shift signals adjacent to each other. Preferably, N is equal to 4 and the frequency of any of the four phase-shift signals is half of the frequency of the voltage-controlled signal $f_{VCO}$. In other words, the multi-phase generator 302 generates four phase-shift signals $f_{VCO/2-00}$, $f_{VCO/2-01}$, $f_{VCO/2-10}$, and $f_{VCO/2-11}$, any of the four phase-shift signals has a frequency equal to half of the frequency of the voltage-controlled signal $f_{VCO}$, and the four phase-shift signals have a phase shift of 90 degree between any two adjacent phase-shift signals. FIG. 4 is a waveform diagram of a part of the signals of the frequency shift keying modulator 30.

The sigma-delta modulator 308 receives transmission data and randomly outputs a modulation bit at a modulation clock $f_{CLK}$ according to the transmission data (that is, according to the frequency division ratio related to the transmission data). In a preferred embodiment of the present invention, the frequency of the modulation clock $f_{CLK}$ is, but not limited to, half of the frequency of any of the four phase-shift signals. In particular, the frequency divider 306 divides the phase-shift signal $f_{VCO/2-11}$ by 2 to get the modulation clock $f_{CLK}$. As the frequency shift keying modulator 30 according to the present invention can be applied in such as the biomedical field that requires a frequency of several hundred MHZ, the modulation clock $f_{CLK}$ formed according to the phase-shift signal $f_{VCO/2-11}$ has a frequency of several hundred MHZ, in other words, the sigma-delta modulator 308 in the frequency shift keying modulator 30 according to the present invention operates under an extra high sampling frequency. As a result, quantization noise and unwanted spur can be eliminated.

The phase rotator 304 receives the four phase-shift signals and selectively outputs one of the four phase-shift signals and a frequency-divided signal $f_{VCO'}$ according to the modulation bit outputted from the sigma-delta modulator 308, wherein the frequency of the frequency-divided signal $f_{VCO'}$ is $$1\big/\left(1+\frac{n}{N}\right)$$

of the frequency of any one the four phase-shift signals (denoted as reference frequency), and n is an integer in the range of 1 to (N-1). For example, if N is equal to 4 as described above and n is equal to 1, in the case the sigma-delta modulator 308 outputs a modulation bit of "1", the phase rotator 304 outputs the frequency-divided signal $f_{VCO'}$ having a frequency that is $$1\big/\left(1+\frac{1}{4}\right)$$

of the reference frequency, that is, 1/1.25 of the reference frequency. On the other hand, in the case the sigma-delta modulator 308 outputs a modulation bit of "0", the phase rotator 304 outputs any of the four phase-shift signals. As the frequency of the frequency-divided signal $f_{VCO'}$ is $$1\big/\left(1+\frac{n}{N}\right)$$

of the reference frequency, the frequency of the modulation signal outputted by the phase rotator 304, dependant on variation of the transmission data (that is the frequency division ratio), is in the range from $$1\big/\left(1+\frac{n}{N}\right)$$

of the reference frequency to the reference frequency. In particular, if the modulation bit corresponding to the frequency division ratio is mostly "1", the frequency of the modulation signal outputted by the phase rotator 304 is much close to $$1\big/\left(1+\frac{n}{N}\right)$$

of the reference frequency; otherwise, if the modulation bit corresponding to the frequency division ratio is mostly "0", the frequency of the modulation signal outputted by the phase rotator 304 is much close to the reference frequency. The equation is shown as follows:

$$f_{out} = r \times \frac{f_{in}}{1+\frac{n}{N}} + (1-r) \times \frac{f_{in}}{1+\frac{0}{N}} = f_{in} \times \left(1 - \frac{r}{5}\right).$$

Wherein, $f_{out}$ is (average) frequency of the modulation signal outputted by the phase rotator 304, $f_{in}$ is the reference frequency, and r is the frequency division ratio. Thus, frequency of the modulation signal outputted by the phase rotator 304 can be changed by changing the transmission data. On the other hand, with the number of the modulation bits increases, the modulation signal outputted by the phase rotator 304 can obtain a quite precise frequency.

Figure 5:
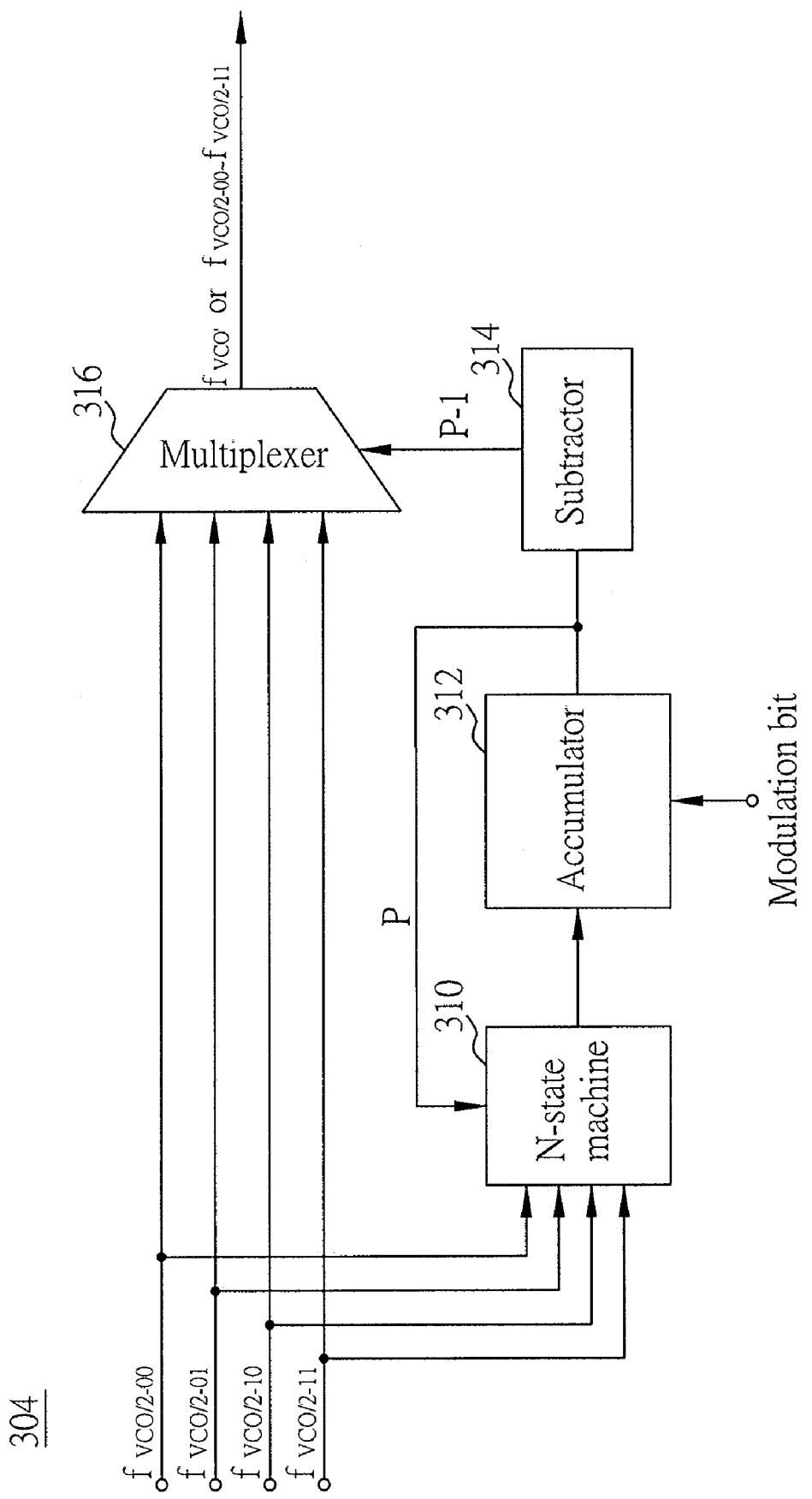
FIG. 5 is a block diagram of the phase rotator of the frequency shift keying modulator of FIG. 3.

Please referring to both FIG. 3 and FIG. 5, wherein FIG. 5 is a block diagram of the phase rotator 304 of the frequency shift keying modulator 30. The phase rotator 304 comprises a falling-edge triggered detection N-state machine 310 coupled to the multi-phase generator 302, an accumulator 312 coupled between the N-state machine 310 and the sigma-delta modulator 308, a subtractor 314 coupled to the accumulator 312, and a N-to-1 multiplexer 316 coupled to the multi-phase generator 302 and the subtractor 314, wherein the accumulator 312 receives the modulation bit.

The N-state machine 310 has a state value P, which receives the four phase-shift signals and outputs one of the phase-shift signals corresponding to the state value P. For example, if the state value P is "01", the N-state machine 310 outputs the phase-shift signal $f_{VCO/2-01}$; on the other hand, if the state value is "11", the N-state machine 310 outputs the phase-shift signal $f_{VCO/2-11}$.

The accumulator 312 counts the number of the falling edges of the phase-shift signal outputted by the N-state machine 310 according to the modulation bit and when the accumulated value reaches a predefined value such as 2, the accumulated value is reset to zero and if the state value does not reach the biggest value (that is "11"), the state value is added by 1, otherwise if the state value reaches "11", the state value is returned to the smallest value (that is "00"). Continuing the above-described example, if the modulation bit received by the accumulator 312 is "1" and the state value is "01", the accumulator 312 begins to count the number of the falling-edges of the phase-shift signal $f_{VCO/2-01}$ and when the accumulated value reaches 2, the accumulated value is reset to zero and the state value P is added by 1 (because the state value P has not yet reached "11"), that is, the state value P becomes "10". Accordingly, the N-state machine 310 outputs the phase-shift signal $f_{VCO/2-10}$ corresponding to the state value P of "10". On the other hand, if the modulation bit received by the accumulator 312 is "1" and the state value is "11" (the biggest value), the accumulator 312 begins to count the number of the falling-edges of the phase-shift signal $f_{VCO/2-11}$ and when the accumulated value reaches 2, the accumulated value is reset to zero and the state value P is returned to the smallest value ("00"). The N-state machine 310 then outputs the phase-shift signal $f_{VCO/2-00}$ corresponding to the state value P of "00". The above operation occurs in the case the accumulator 312 receives the modulation bit of "1". In the case the modulation bit received by the accumulator 312 is "0", the accumulator 312 does not count the number of the falling-edges of the phase-shift signal outputted by the N-state machine 310. Thus, the accumulated value does not change, that is, does not reach the predefined value, and the state value P also does not change. As a result, the N-state machine 310 continuously outputs a same phase-shift signal until the accumulator 312 receives a modulation bit of "1" and the accumulated value reaches 2.

The subtractor 314 subtracts the state value P by 1 in the case the state value P is not equal to the smallest value (that is, "00"), or sets the state value P to the biggest value (that is, "11") in the case the state value P is equal to "00". For example, in the case the state value P is "11", "10" or "01", the subtractor 314 outputs a state value P-1 of "10", "01" or "00". In the case the state value P is "00", the substractor 314 outputs a state value P-1 of "11".

The N-to-1 multiplexer 316 outputs one of the four phase-shift signals corresponding to the state value P-1 outputted from the subtractor as the frequency-divided signal $f_{VCO'}$. Referring to FIG. 4, in the case the modulation bit received by the accumulator 312 is "1" and the state value P is "01", the N-state machine 310 outputs the phase-shift signal $f_{VCO/2-01}$ and the accumulator 312 begins to count the number of the falling-edges of the phase-shift signal $f_{VCO/2-01}$. Meanwhile, the subtractor 314 outputs a state value P-1 of "00" (that is, "01"-1). Correspondingly, the N-to-1 multiplexer 316 outputs the phase-shift signal $f_{VCO/2-00}$ as the frequency-divided signal $f_{VCO'}$, as shown in region I of FIG. 4. Subsequently, when the modulation bit received by the accumulator 312 is still "1" and the number of the falling-edges of the phase-shift signal $f_{VCO/2-01}$ counted by the accumulator 312 reaches 2 (as shown in arrow A), the state value P is added by 1 and becomes "10". Meanwhile, the subtractor 314 outputs a state value P-1 of "01" (that is "10"-1). Correspondingly, the N-to-1 multiplexter 314 outputs the phase-shift signal $f_{VCO/2-01}$ as the frequency-divided signal $f_{VCO'}$, as shown in region II of FIG. 5. Similarly, if the accumulator 310 continuously receives a modulation bit of "1", the N-to-1 multiplexter 314 cyclically outputs the phase-shift signals $f_{VCO/2-01}$, $f_{VCO/2-10}$, $f_{VCO/2-11}$ and $f_{VCO/2-00}$ in sequence respectively from positions of arrows A, B, C and D, as shown in regions II, III, IV and V of FIG. 4. In other words, the multi-phase generator 302, the phase rotator 304, the frequency divider 306 and the sigma-delta modulator 308 of the frequency shift keying modulator 30 are equivalent to a sigma-delta modulated phase rotator. In particular, the phase rotator 304 "rotates" or "does not rotate" according to the modulation bit "1" or "0" outputted from the sigma-delta modulator 308. In addition, as shown in FIG. 4, the frequency of the frequency-divided signal $f_{VCO'}$ is 1/1.25 of the frequency of any of the four phase-shift signals. The above operation occurs when the accumulator 312 receives the modulation bit of "1". On the other hand, in the case the modulation bit received by the accumulator 312 is "0" and the state value P is "10", the subtractor 314 outputs a state value P-1 of "01", correspondingly, the N-to-1 multiplexer 316 continuously outputs the phase-shift signal $f_{VCO/2-01}$ until the accumulator 312 receives a modulation bit of "1" and the accumulated number reaches 2.

Compared with the prior art, as the frequency shift keying modulator of the present invention comprises the phase-locked loop and the sigma-delta modulator used for modulating the frequency "locked" by the phase-locked loop, the conventional problem of drift of center frequency of opened-loop direct-modulation wireless transmitter is overcome. In addition, as the sigma-delta modulator can modulate the frequency locked by the phase-locked loop, the frequency shift keying modulator of the present invention is equivalent to a pseudo-opened-loop frequency shift keying modulator applicable in broadband transmission signal. Further, as shown in FIG. 4, by counting the number of the falling-edges, the frequency shift keying modulator of present invention avoids glitch during phase switching.

The above-described descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A frequency shift keying modulator (FSK modulator) having sigma-delta modulated phase rotator, comprising:
    a phase-locked loop for generating a voltage-controlled signal;
    a multi-phase generator coupled to the phase-locked loop for receiving the voltage-controlled signal and generating N phase-shift signals having same frequency according to the voltage-controlled signal, the N phase-shift signals having a same phase shift between the phase-shift signals adjacent to each other;
    a sigma-delta modulator for receiving transmission data and randomly outputting a modulation bit at a modulation clock according to the transmission data; and
    a phase rotator coupled to the multi-phase generator and the sigma-delta modulator for receiving the N phase-shift signals and selectively outputting one of the N phase-shift signals and a frequency-divided signal according to the modulation bit, wherein the frequency of the frequency-divided signal is $$1/\left(1+\frac{n}{N}\right)$$

of the frequency of any one of the N phase-shift signals, n is an integer in the range of 1 to (N-1).

2. The frequency shift keying modulator of claim 1, wherein, the frequency of any of the N phase-shift signals is half of the frequency of the voltage-controlled signal.

3. The frequency shift keying modulator of claim 2, further comprising a frequency divider coupled between the multi-phase generator and the sigma-delta modulator for receiving one of the N phase-shift signals and dividing the received phase-shift signal by 2 to get the modulation clock.

4. The frequency shift keying modulator of claim 1, wherein the phase rotator comprises:
    a falling-edge triggered detection N-state machine having a state value, the N-state machine is coupled to the multi-phase generator for receiving the N phase-shift signals and outputting one of the N phase-shift signals corresponding to the state value;
    an accumulator coupled to the N-state machine for counting the number of the falling edges of the phase-shift signal outputted from the N-state machine according to the modulation bit and resetting the accumulated value to zero when the accumulated value reaches a predefined value, and adding the state value by 1 in the case the state value does not reach the biggest value, and otherwise in the case the state value reaches the biggest value, retuning the state value to the smallest value;
    a subtractor coupled to the N-state machine for subtracting the state value by 1 in the case the state value is not equal to the smallest value and setting the state value to the biggest value in the case the state value is equal to the smallest value; and
    a N-to-1 multiplexer coupled to the multi-phase generator and the subtractor for outputting one of the N phase-shift signals corresponding to the state value outputted from the subtractor as the frequency-divided signal.

5. The frequency shift keying modulator of claim 4, wherein the predefined value is equal to 2, N is equal to 4 and n is equal to 1.

* * * * *